United States Patent Office 3,412,325
Patented Nov. 19, 1968

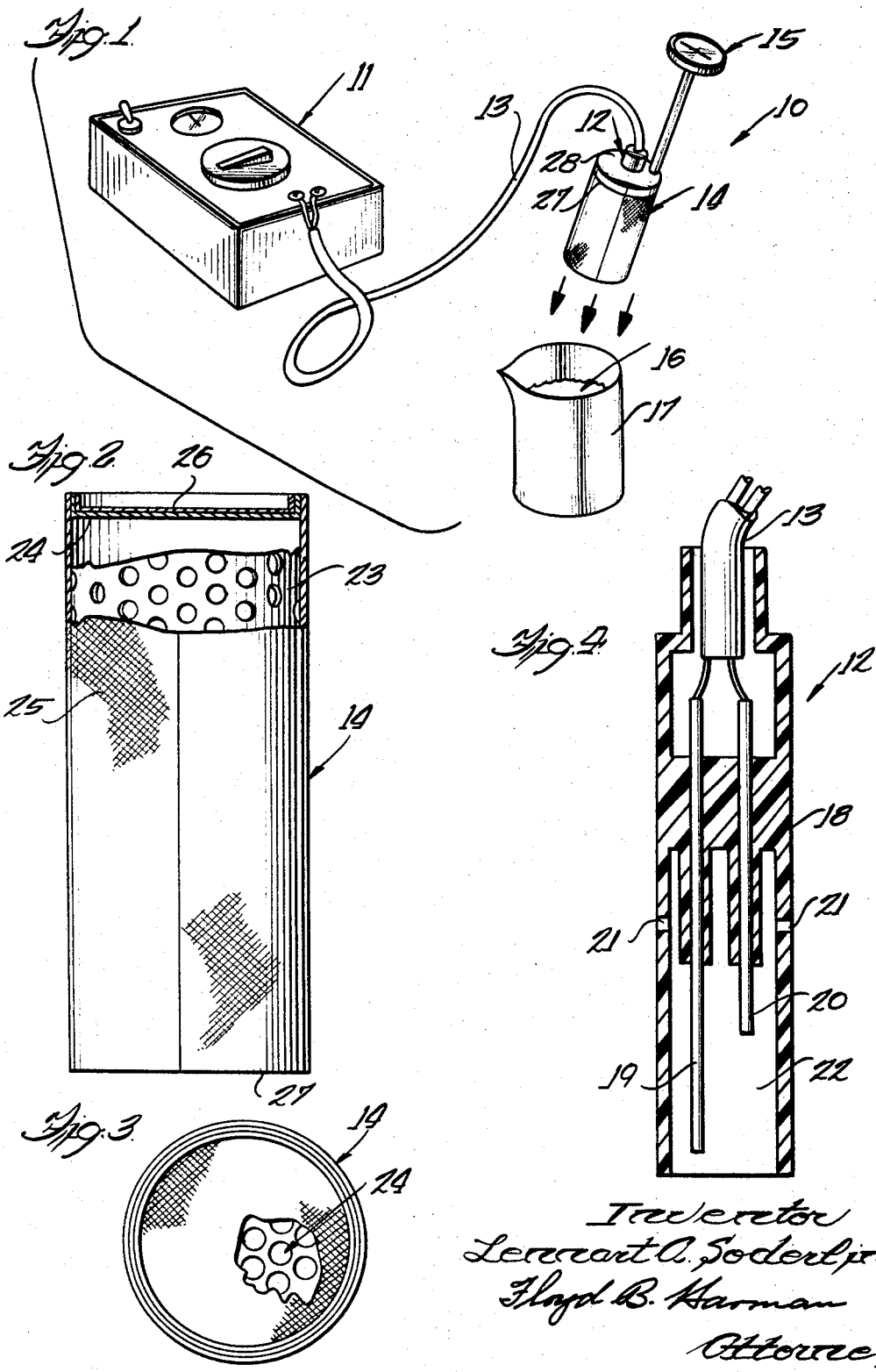

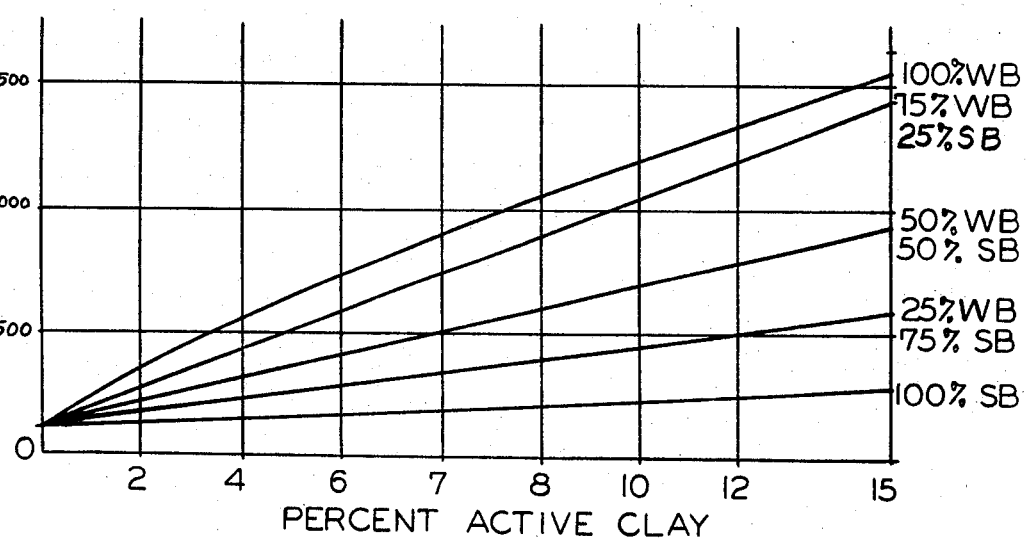
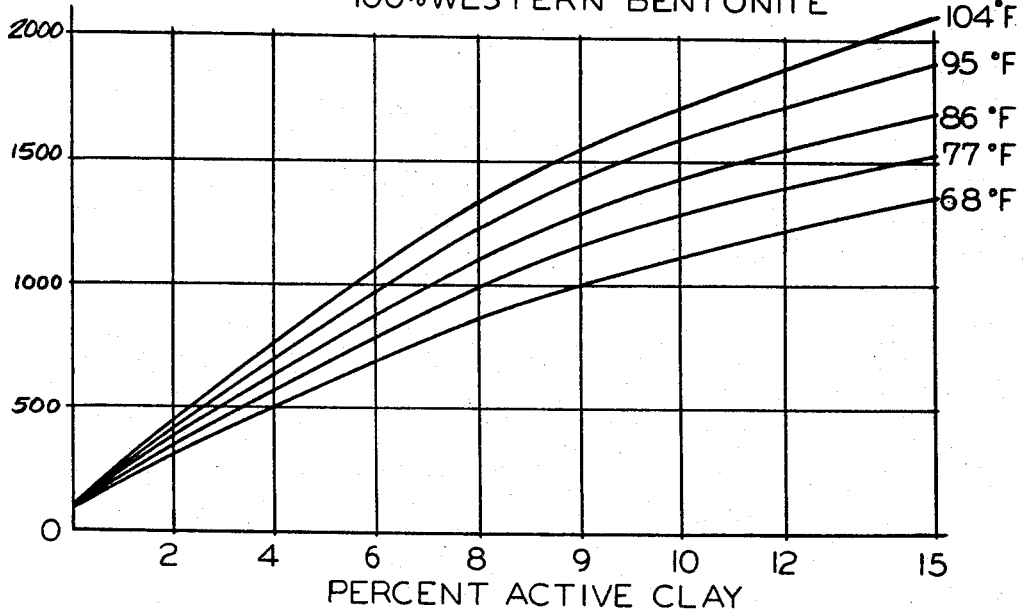

3,412,325
ELECTRICAL CONDUCTIVITY TEST METHOD
FOR DETERMINING ACTIVE CLAY CONTENT
IN MOLDING SAND COMPOSITIONS
Lennart A. Soderling, Dolton, Ill., assignor to International Harvester Company, Chicago, Ill., a corporation of Delaware
Filed Aug. 20, 1964, Ser. No. 390,866
3 Claims. (Cl. 324—65)

ABSTRACT OF THE DISCLOSURE

A low-cost method for rapidly determining, quantitatively in weight-percent, the active clay present in a green sand molding composition whereby the foundryman is enabled to adjust accurately the active clay content thereof to within prescribed limits. The method consists of measuring the electrical conductivity and temperature of an aqueous slurry extract of a green sand molding composition and translate the electrical conductivity value obtained to active clay content in terms of weight-percent.

---

Figure 7:
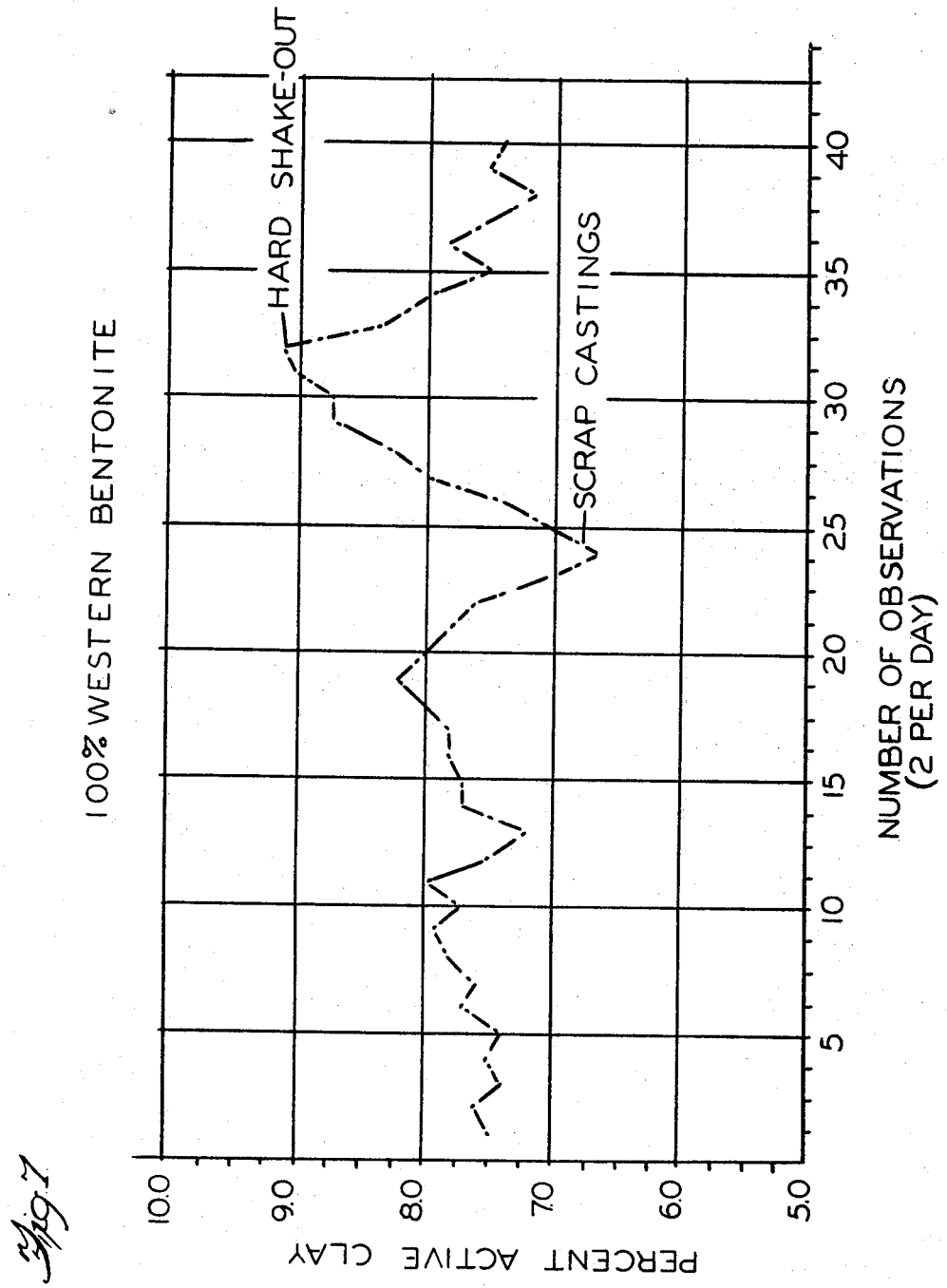

This invention relates to a method for determining the active clay content in green sand molding compositions. More in particular this invention relates to a method for controlling the active clay content in sand molding compositions.

In green sand mold compositions clays are used to bond the sand particles together. The amount of active clay present in molding sand compositions determines how well the formed mold will retain its shape when molten metal is poured into it, and how well it will resist thermal stresses until the casting is solidified. Such clay is termed "active clay" and the active clay content, expressed in terms of percent by weight, is a measure of the stability of the mold. If the active clay content is too low, scrap castings result for the pouring operation fractures portions of the mold. On the other hand if the active clay content is too high, it becomes difficult to remove the casting from the mold (i.e. hard shake-out).

Green sand molding compositions employing active clay deteriorate progressively on repeated use. Apparently the high temperatures attained during casting operations progressively destroys the binding ability of the clay resulting in inert fines or "dead clay." Thus it is necessary to add fresh active clay to the sand composition in order to obtain consistently good castings.

Present known methods of estimating the active clay content of green sand molding compositions are, in essence, purely a matter of judgment by the foundrymen. Particularly, where the green sand molding composition has been used repeatedly and thus partly deteriorated is often erroneous resulting in high scrap loss in castings which is obviously expensive.

Accordingly, it is a prime object of the present invention to provide a method for accurately determining the active clay content of green sand molding compositions.

Another important object of the invention is to provide a method for determining rapidly and efficiently the active clay content of green sand molding compositions.

A still further important object of the invention is to provide a method for accurately controlling the active clay content of green sand molding composition within specified limits rapidly and efficiently.

These and other important and desirable objects inherent in and encompassed by the invention will be more readily understood from the ensuing desecription, the appended claims and the annexed drawings wherein:

FIGURE 1 is a perspective view of the apparatus in assembled form employed in carrying out the invention;
FIGURE 2 illustrates the details of construction of the filter basket component of the apparatus of FIGURE 1, partly in section and broken away;
FIGURE 3 is an end view, partly broken away, of the filter basket component of FIGURE 2;
FIGURE 4 is a longitudinal sectional view of a conventional dip cell component of the apparatus of FIGURE 1;
FIGURE 5 is a graph or chart illustrating the electrolytic conductivity characteristics at fixed temperature of aqueous extracts of green sand molding compositions employing at least one type of active clay;
FIGURE 6 illustrates the effect of temperature on the electrolytic conductivity characteristics of aqueous extracts of green sand molding compositions containing an active clay; and
FIGURE 7 illustrates comparatively the results of controlling commercial foundry green sand molding compositions for active clay content for an initial ten day period followed by an additional ten day period wherein the foundry controlled active clay content according to previously known means.

In searching for a better and more accurate method for controlling the active clay content of green sand molding compositions it was discovered that when such sand compositions were extracted with water, the electrical conductance of the slurry thus obtained was directly related to the amount of active clay present, expressed in percent by weight, in the composition which is termed the "active clay content" of the composition. It thus became apparent that active clay exhibits ionic activity of well defined quantitative characteristics.

Referring to FIGURE 1 of the drawing, it will be seen that the apparatus, indicated by the numeral 10, employed in carrying out the invention includes a Wheatstone Bridge 11 connected to a conductivity dip cell 12 (FIGURE 4) through conductor leads 13. Surrounding the conductivity dip cell 12 is a filter basket 14. Also positioned adjacent the cell 12 within the basket 14 is the temperature sensitive element of a thermometer 15. The assembly of components 12, 14 and 15 are immersed in a slurry 16 contained within a receptacle such as a conventional laboratory glass beaker 17. The electrical conductivity and temperature of the slurry 16 are then measured in a conventional manner. A description of each of the components for clarity will now be made.

The Wheatstone or conductivity bridge is of a conventional design. For example, Model RB-2 conductivity bridge made by Industrial Instruments Inc., of Cedar Grove, Essex County, N.J., performs satisfactorily for the purpose of the present invention.

The conductivity dip cell 12 is of a conventional construction which may comprise a plastic casing 18 having imbedded therein a pair of electrodes 19 and 20. As viewed in FIGURE 4, the bottom end of the casing 18 is open to permit entry of the slurry 16 therethrough for contact with both electrodes 19 and 20. A plurality of transverse ports, two of which are shown at 21, are provided to vent any air in the opening 22 so that the slurry 16 may completely envelop the electrodes 19, 20. A satisfactory conductivity dip cell 12 may be commercially obtained from the aforesaid Industrial Instruments, Inc., as their Model No. S–2.

The filter basket 14 is cylindrically shaped two inches in diameter and five inches long for convenience in size. It is comprised of a cylindrically shaped perforated member 23 made of stainless steel. Secured to the bottom of the member 23 is a stainless steel perforated disc member 24 forming a cup-shaped assembly. Disposed in secured relation to the outer side of the cylindrical member 23 is a 325 mesh screen 25 formed from stainless steel wire. Likewise, the disc member 24 is also covered with a 325 mesh stainless steel wire screen 26. From this it will be apparent that when the filter basket 25 with the member 24 and screen 26 downwardly extending is lowered into a slurry 16 only the portion of the slurry passable through the screens 25 and 26 will enter the inner hollow portion of the cup-shaped filter basket 14.

Fitted to the upper end 27 of the filter basket 14 in friction secured relation is a cap 28. The cap 28 is provided with suitable apertures to engage frictionally the upper end portion of the cell 12 and the lower portion of the conventional immersion type dial thermometer 15. Thus, when assembled, the cap 28 secures the thermometer 15, cell 12 and filter basket 14 together in rigid relation. Thus from FIGURE 1 it will be apparent that the assembly of components 12, 14 and 15 is capable of being placed in the beaker 17 whereby the slurry 16 contained therein passes through the screens 25, 26 of the filter basket 14 to the inner hollow portion thereof to fill the opening 22 of the cell 12 so that the filtered portion of the slurry 16 completely surrounds the electrodes 19 and 20. The Wheatstone bridge 11 may therefore measure the electrical conductivity of the filtered portion of slurry 16 between electrodes 19 and 20 and the thermometer measures the temperature of the slurry 16. The procedure for preparing a slurry from a specimen or sample of green sand molding composition and the testing thereof according to this invention will now be described by way of example:

EXAMPLE (1) Dry a sample (approximately 250 grams) of green sand molding composition containing active clay in a conventional Dietert Moisture Teller for about ten minutes.

(2) Screen the dried sample through a No. 20 sleeve.

(3) Measure exactly 400 cubic centimeters of distilled water and place in a conventional mixing receptacle.

(4) Weigh exactly 200 grams of the dried and sifted sand and add to water in said mixing receptacle.

(5) Stir vigorously the sand and water mixture for two minutes using a power stirrer. Decant the liquid slurry 16 portion of the mixture into a 500 ml. tall receptacle such as beaker 17 of FIGURE 1.

(6) Immerse the major portion of the filter basket 14 with thermometer 15 and conductivity cell 12 assembly into the slurry 16 as indicated in FIGURE 1.

(7) Ascertain the temperature of the slurry 16 from thermometer 15 and appropriately adjust the temperature compensator on the Wheatstone bridge 11.

(8) Record the electrical conductivity on the bridge 11 in micro-mhos of conductance.

It will be apparent from FIGURE 6 that the electrical conductivity of a given slurry 16 varies with temperature. For example, from FIGURE 6 a molding sand composition containing 8% western bentonite, and active clay commonly used, a slurry 16 made therefrom according to the above described procedures has a conductance of 879 micro-mhos at 68° F. and 1370 micro-mhos when the temperature of the slurry 16 is elevated to 104° F. Hence, a temperature correction which may be accomplished on the conventional Wheatstone bridge is essential.

From FIGURE 5 it is apparent that different types of active clay exhibit different conductivity characteristics. For example, southern bentonite, another commonly used active clay, exhibits a much lower conductivity than that of the aforementioned western bentonite active clay. As may well be exepcted, mixtures of the two clays will exhibit conductivity characteristics intermediate as indicated in the chart of FIGURE 5.

In general foundries employ one active clay which, for example, may be western bentonite or a preferred mixture of clays, e.g. 50% western bentonite and 50% southern bentonite. From this it immediately becomes apparent that the foundry engineer needs only to make up several slurries from green sand molding compositions having varied known amounts of active clay therein. The electrical conductivity is then determined for each of the known slurries at a fixed selected temperature. The results are plotted to form a calibrated curve or graph of the type illustrated in the chart of FIGURE 5. Once such curve or translation means is established the foundry engineer needs only to determine periodically the conductivity of the slurry extracted from the green sand molding composition of his foundry, corrected to the same temperature from which his graph was developed, and read directly from the graph the active clay content of his molding sand composition.

Referring now to FIGURE 7 the invention herein described was employed to control the active clay content in green sand molding compositions in a commercial foundry for an initial period of ten days. The clay employed by the foundry was western bentonite. From FIGURE 7 it will be seen that the active clay content varied from about 7.2% minimum to a maximum of about 8.2% by weight. Thereafter for the next ten days the foundry reverted to its previous known technique for estimating the active clay content of the molding sand compositions. From FIGURE 7 it is seen that during the 12–13th day period scrap castings resulted due to insufficient active clay content. The foundrymen began adding active clay at a rate greater than necessary until the 16th day when hard shake-out was experienced necessitating addition of fresh sand to the mixture. From FIGURE 7 it appears that the active clay content should be limited to the range of 7 to 9 percent by weight.

Having thus described an embodiment of the invention, it can now be seen that the objects of the invention have been fully achieved and it must be understood that changes and modifications may be made which do not depart from the spirit of the invention as disclosed nor from the scope thereof as defined in the appended claims.

What is claimed is:

1. The method of determining the active clay content of a green sand molding composition consisting of the steps of:

preparing an aqueous slurry by mixing a predetermined amount of water with a predetermined quantity of said composition, measuring the electrical conductivity of said slurry, measuring the temperature of said slurry, and converting the results of electrical conductance and temperature thus obtained to active clay content in terms of weight percent by comparison with a calibrated translation means, said translation means being prepared by measuring the electrical conductivity and temperature of several aqueous slurries each prepared by mixing a predetermined amount of water with a predetermined quantity of green sand molding composition having a known amount of active clay therein.

2. The method of determining the active clay content of a molding composition according to claim 1 which includes the further step of separating said aqueous slurry from the sand of said molding composition by decantation prior to measuring the electrical conductivity thereof.

3. The method of determining the active clay content of a molding composition according to claim 1 followed by the step of admixing with said composition an amount of additional active clay equal to an amount required to bring the active clay content of the resulting admixture to a value within the range prescribed by predetermined maximum and minimum limits.

(References on following page)

References Cited

UNITED STATES PATENTS

| | | | |
|---|---|---|---|
| 2,277,953 | 3/1942 | Christensen | 324—61 |
| 2,285,421 | 6/1942 | Dunmore | 324—62 X |
| 2,707,880 | 5/1955 | Wannamaker | 324—62 X |
| 2,759,148 | 8/1956 | Store | 324—65 |
| 2,852,740 | 9/1958 | Posey et al. | 324—65 |
| 2,927,252 | 3/1960 | Hartley | 324—65 X |
| 3,068,404 | 11/1962 | Moore et al. | 324—65 |
| 3,129,928 | 4/1964 | Huntington. | |
| 3,147,432 | 9/1964 | Warfield | 324—65 |
| 2,466,453 | 4/1949 | Locke | 324—65 |
| 2,764,892 | 10/1956 | Rosenthal | 73—344 |
| 2,870,404 | 1/1959 | Oxley | 324—65 |
| 3,070,858 | 1/1963 | Deacon | 164—154 |
| 3,249,970 | 5/1966 | Hartley | 324—65 X |

ARCHIE R. BORCHELT, *Primary Examiner.*

E. E. KUBASIEWICZ, *Assistant Examiner.*